US012602814B2

(12) United States Patent
Ohnishi et al.

(10) Patent No.: US 12,602,814 B2
(45) Date of Patent: Apr. 14, 2026

(54) INFORMATION PROCESSING DEVICE, INFORMATION PROCESSING METHOD, AND COMPUTER READABLE MEDIUM FOR DETERMINING ATTACHMENT STATE OF IN-VEHICLE CAMERA

(71) Applicant: DENSO TEN Limited, Hyogo (JP)

(72) Inventors: Koji Ohnishi, Kobe (JP); Naoshi Kakita, Kobe (JP); Takayuki Ozasa, Kobe (JP)

(73) Assignee: DENSO TEN LIMITED, Kobe (JP)

( * ) Notice: Subject to any disclaimer, the term of this patent is extended or adjusted under 35 U.S.C. 154(b) by 429 days.

(21) Appl. No.: 18/186,575

(22) Filed: Mar. 20, 2023

(65) Prior Publication Data

US 2024/0104759 A1 Mar. 28, 2024

(30) Foreign Application Priority Data

Sep. 26, 2022 (JP) ................................. 2022-152998

(51) Int. Cl.
*G06T 7/70* (2017.01)
*G06T 7/00* (2017.01)

(52) U.S. Cl.
CPC .............. *G06T 7/70* (2017.01); *G06T 7/0002* (2013.01); *G06T 2207/30268* (2013.01)

(58) Field of Classification Search
CPC ... G06T 7/80; G06T 7/70; G06T 2207/30244; G06T 7/00; G06V 20/56; G06V 10/10
See application file for complete search history.

(56) References Cited

U.S. PATENT DOCUMENTS

2015/0092058 A1* 4/2015 Bone .......................... G06T 7/80
348/148
2015/0145965 A1* 5/2015 Livyatan ................. G06F 18/22
348/47
(Continued)

FOREIGN PATENT DOCUMENTS

JP 2020-060550 A 4/2020
JP 2020198074 A * 12/2020
(Continued)

OTHER PUBLICATIONS

"Artoolkit Overview"; URL:http://im-lab.net/artoolkit-overview/); (online), Keio University, (retrieved on Jul. 25, 2022).

*Primary Examiner* — Guillermo M Rivera-Martinez
(74) *Attorney, Agent, or Firm* — OLIFF PLC.

(57) ABSTRACT
An information processing device includes a controller configured to execute a posture estimation processing by extracting a pair group of line segments based on an optical flow of a feature point on a road surface from a processing target region set in a camera image captured by an in-vehicle camera and by estimating a posture of the in-vehicle camera based on an angle estimation value at which the in-vehicle camera is attached, the angle estimation value being estimated from each pair data included in the pair group. The controller is configured to determine that an attachment state of the in-vehicle camera is abnormal in response to at least one of a data accumulation number of the pair data, a standard deviation of the angle estimation value, or a deviation amount from a given calibration value relating to the posture in the posture estimation processing being out of a preset range.

6 Claims, 6 Drawing Sheets

DATA ACCUMULATION NUMBER

STANDARD DEVIATION

DEVIATION AMOUNT FROM CALIBRATION VALUE

AT LEAST ONE IS NOT ALLOWABLE
⇓
DETERMINE THAT ATTACHMENT STATE
OF CAMERA IS ABNORMAL

(56)                    References Cited

U.S. PATENT DOCUMENTS

| | | | | |
|---|---|---|---|---|
| 2018/0050638 A1* | 2/2018 | Lee | ............................ | G06T 7/73 |
| 2018/0139368 A1* | 5/2018 | Nakayama | ........... | G06V 20/584 |
| 2018/0150976 A1* | 5/2018 | Loy | ...................... | G06V 10/764 |
| 2018/0292201 A1* | 10/2018 | Sakano | ...................... | G06T 7/80 |
| 2018/0365524 A1* | 12/2018 | Kajiwara | ................ | G06T 7/246 |
| 2018/0365859 A1* | 12/2018 | Oba | .................... | B60W 40/114 |
| 2019/0206060 A1* | 7/2019 | Matsumoto | ........... | G06T 7/0004 |
| 2019/0325607 A1* | 10/2019 | Ohnishi | .................... | B60R 1/12 |
| 2020/0082568 A1* | 3/2020 | Hayakawa | ................ | G06T 7/70 |

FOREIGN PATENT DOCUMENTS

| | | | | |
|---|---|---|---|---|
| JP | 2021-086258 | A | | 6/2021 |
| JP | 2021093670 | A | * | 6/2021 |
| WO | 2012/172713 | A1 | | 12/2012 |
| WO | 2017/038160 | A1 | | 3/2017 |
| WO | 2017/093036 | A1 | | 6/2017 |

* cited by examiner

FIG. 3
DERIVATION IN UPPER-LOWER DIRECTION
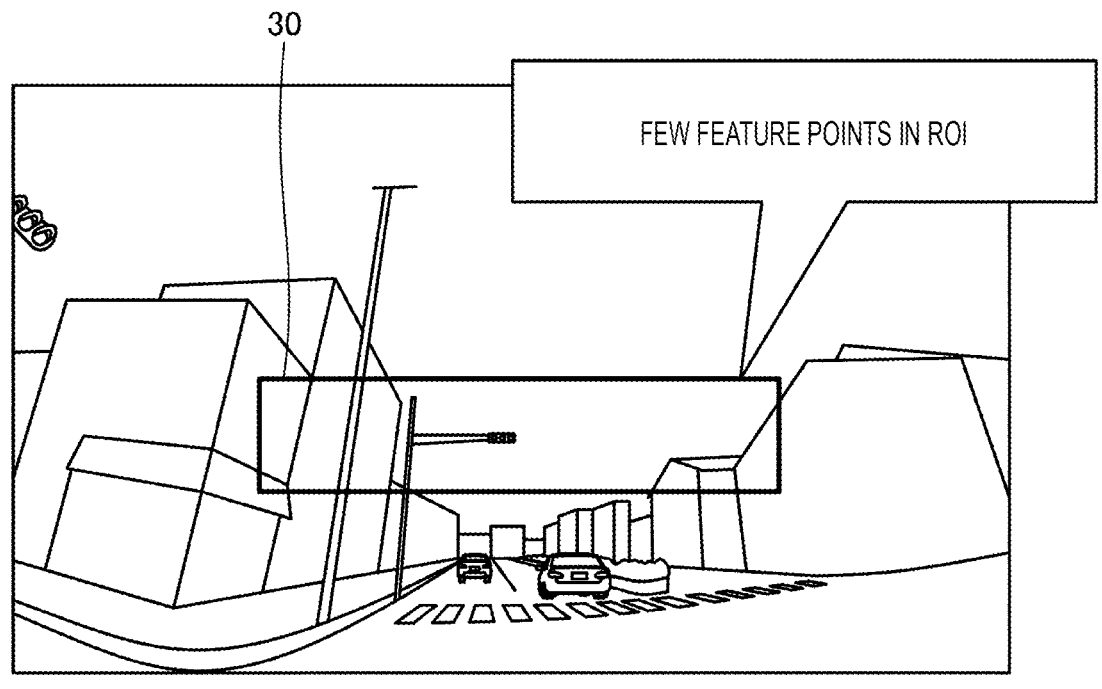
FEW FEATURE POINTS IN ROI
FIG. 4
DERIVATION IN LEFT-RIGHT DIRECTION
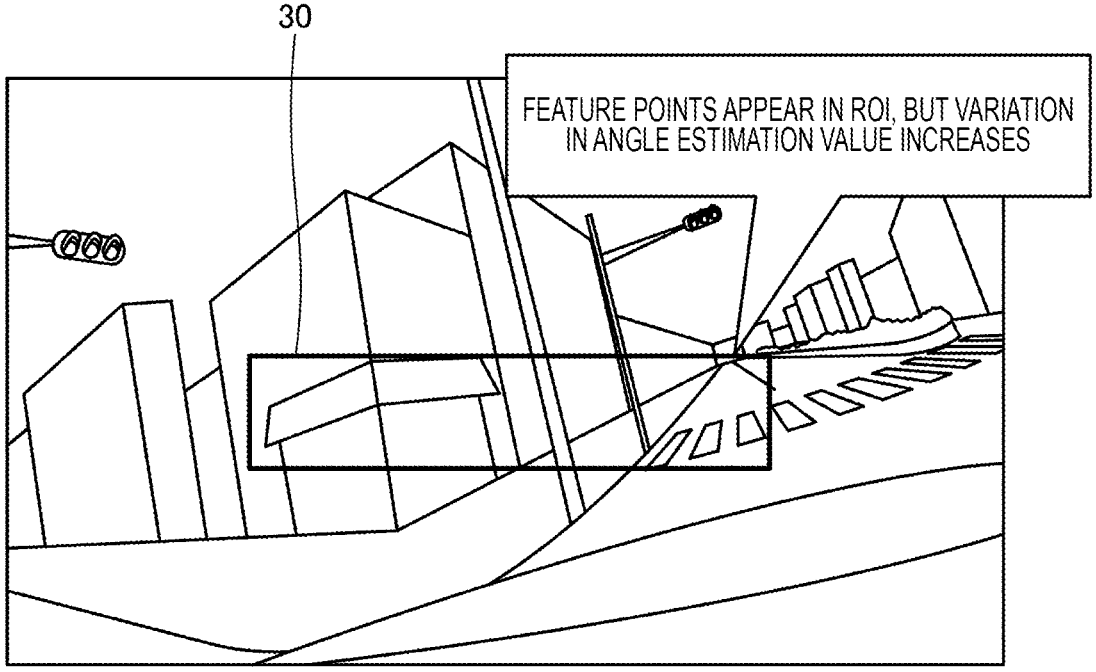
FEATURE POINTS APPEAR IN ROI, BUT VARIATION IN ANGLE ESTIMATION VALUE INCREASES

| DATA ACCUMULATION NUMBER |
| --- |
| STANDARD DEVIATION |
| DEVIATION AMOUNT FROM CALIBRATION VALUE |

AT LEAST ONE IS NOT ALLOWABLE
⇓
DETERMINE THAT ATTACHMENT STATE
OF CAMERA IS ABNORMAL

FIG. 8

NORMALITY DETERMINATION CONDITIONS

| CONDITION ITEMS | (1) IMMEDIATELY AFTER IG ON | (2) AFTER IMMEDIATELY AFTER IG ON |
|---|---|---|
| TRAVELING TIME | 10 MINUTES | 30 MINUTES |
| DATA ACCUMULATION NUMBER | 100 OR MORE | 100 OR MORE |
| STANDARD DEVIATION | 10 OR LESS | 10 OR LESS |

FIG. 9

ABNORMALITY DETERMINATION CONDITIONS

| CONDITION ITEMS | (1) IMMEDIATELY AFTER IG ON | | (2) AFTER IMMEDIATELY AFTER IG ON | | |
|---|---|---|---|---|---|
| | ( 1-1 ) | ( 1-2 ) | (2-1 ) | (2-2 ) | (2-3 ) |
| TRAVELING TIME | 10 MINUTES | 10 MINUTES | 10 MINUTES | 30 MINUTES | 30 MINUTES |
| DATA ACCUMULATION NUMBER | 10 OR LESS | 100 OR MORE | 10 OR LESS | 100 OR MORE | 100 OR MORE |
| STANDARD DEVIATION | — | 20 OR MORE | — | 20 OR MORE | 5 OR LESS |
| DEVIATION AMOUNT FROM CALIBRATION VALUE | — | — | — | — | 10 deg OR MORE |
| ESTIMATED STATE | *1 | *2 | *1 | *2 | *3 |

*1: ROAD SURFACE IS NOT DISPLAYED (DOWNWARD DEVIRATION IN TILT)

*2: ROAD SURFACE IS NOT DISPLAYED

*3: ROAD SURFACE IS DISPLAYED BUT DEVIATION AMOUNT FROM KNOWN CALIBRATION VALUE IS LARGE

INFORMATION PROCESSING DEVICE, INFORMATION PROCESSING METHOD, AND COMPUTER READABLE MEDIUM FOR DETERMINING ATTACHMENT STATE OF IN-VEHICLE CAMERA

CROSS-REFERENCE TO RELATED APPLICATIONS

This application is based on and claims priorities under 35 USC 119 from Japanese Patent Application No. 2022-152998 filed on Sep. 26, 2022, the content of which is incorporated herein by reference.

TECHNICAL FIELD

A disclosed embodiment relates to an information processing device, an information processing method, and a computer readable medium storing a program.

BACKGROUND ART

An attachment position and a posture of an in-vehicle camera may change due to unexpected contact, aging, or the like, and may be deviated from a calibration result at the beginning of attachment. In order to detect this deviation, a technique of estimating a posture of an in-vehicle camera based on a camera image captured by the in-vehicle camera has been known in the related art.

For example, JP2021-086258A discloses a technique of extracting a feature point on a road surface from a rectangular region of interest (ROI; processing target region) set in a camera image and estimating a posture of an in-vehicle camera based on an optical flow indicating a motion of the feature point between frames.

By extracting a pair of parallel line segments in a real space based on such an optical flow and using, for example, an algorithm disclosed in a website of Keio University available at im-lab.net/artoolkit-overview, a posture (rotation angles of axes of PAN, TILT, and ROLL) of the in-vehicle camera is estimated.

SUMMARY

There is room in the related art described above for further improvement in accurately and easily detecting an abnormality in an attachment state of the in-vehicle camera.

A posture of an in-vehicle camera estimated using the technique in the related art is used, for example, in image recognition processing in a driving assistance function of a vehicle system, but when a deviation amount from a given calibration value is very small, it is normally possible to perform correction in the image recognition processing. However, when the deviation amount is too large to be corrected, for example, erroneous detection or non-detection of an object occurs in the image recognition processing.

Here, in a case of erroneous detection, for example, when an alert due to erroneous detection frequently occurs, a user can grasp that an attachment state of the in-vehicle camera is abnormal and can readjust the attachment state. On the other hand, in a case of non-detection or when an alert is not notified even in the case of erroneous detection, the user cannot grasp the abnormality in the attachment state. As a result, the attachment state of the in-vehicle camera is not readjusted, and a vehicle system cannot normally operate the driving assistance function.

An aspect of an embodiment has been made in view of the above, and an object thereof is to provide an information processing device, an information processing method, and a computer readable medium storing a program capable of accurately and easily detect an abnormality in an attachment state of an in-vehicle camera.

An information processing device according to an aspect of an embodiment includes a controller. The controller executes a posture estimation processing by extracting a pair group of line segments based on an optical flow of a feature point on a road surface from a processing target region set in a camera image captured by an in-vehicle camera and by estimating a posture of the in-vehicle camera based on an angle estimation value, at which the in-vehicle camera is attached, estimated from pair data of the pair group. The controller determines that the attachment state of the in-vehicle camera is abnormal in response to at least one of a data accumulation number of the pair data, a standard deviation of the angle estimation value, or a deviation amount from a given calibration value relating to the posture in the posture estimation processing being out of a preset range.

According to an aspect of the embodiment, it may be possible to accurately and easily detect an abnormality in an attachment state of an in-vehicle camera.

BRIEF DESCRIPTION OF DRAWINGS

FIG. 3 is a diagram (part 3) illustrating the method for determining an abnormality in a camera attachment state according to the embodiment;

FIG. 4 is a diagram (part 4) illustrating the method for determining an abnormality in a camera attachment state according to the embodiment;

FIG. 8 is a diagram showing normality determination conditions included in determination condition information;

FIG. 9 is a diagram showing abnormality determination conditions included in the determination condition information.

DESCRIPTION OF EMBODIMENTS

Hereinafter, an embodiment of an information processing device, an information processing method, and a program disclosed in the present application will be described in detail with reference to the accompanying drawings. The present invention is not limited to the embodiment described below.

Hereinafter, a case where the information processing device according to the embodiment is an in-vehicle device 10 (see FIG. 6) including a camera 11 will be described as an example. The in-vehicle device 10 is, for example, a drive recorder. Hereinafter, it is assumed that the information processing method according to the embodiment is a method for determining an abnormality in an attachment state of the camera 11 executed by the in-vehicle device 10.

In the following descriptions, "predetermined" may be referred to as "determined in advance". For example, a "predetermined value" may be referred to as a "value determined in advance".

First, details of the method for determining an abnormality in a camera attachment state according to the embodiment will be described with reference to FIGS. 1 to 5. FIGS. 1 to 5 are diagrams (part 1) to (part 5) illustrating the method for determining an abnormality in a camera attachment state according to the embodiment.

When the in-vehicle device 10 estimates a posture of the camera 11 based on an optical flow of a feature point on a road surface, the extracted feature point on the road surface may be a corner portion of a road marking such as a crosswalk or a lane.

Figure 1:
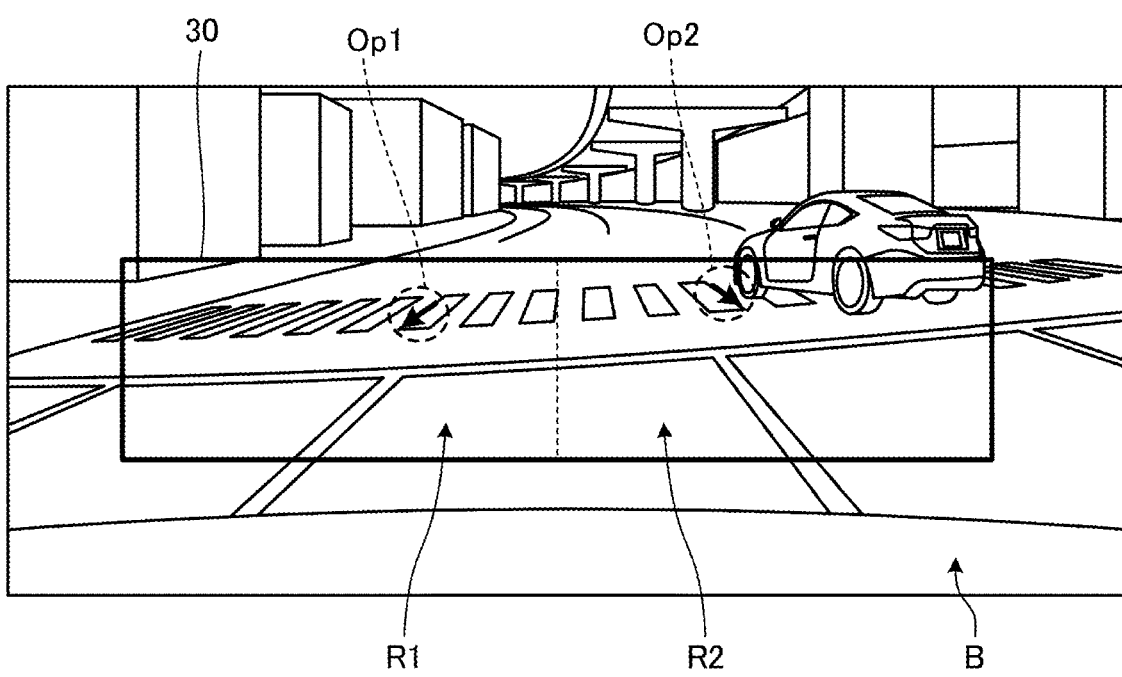
FIG. 1 is a diagram (part 1) illustrating a method for determining an abnormality in a camera attachment state according to an embodiment.

FIG. 1 shows an example in which, in an ROI 30, an optical flow Op1 is extracted in a left half region R1 and an optical flow Op2 is extracted in a right half region R2, the left half region R1 and the right half region R2 being obtained by dividing the ROI 30 into two based on the corner portion of the crosswalk.

The algorithm disclosed in the above-mentioned website of Keio University ((online), Keio University, (retrieved on Jul. 25, 2022), the Internet URL:http://im-lab.net/artoolkit-overview/) is based on a pair of parallel line segments in a real space. In the present embodiment, a pair is generated by combining the optical flow extracted in the region R1 and the optical flow extracted in the region R2.

Both the optical flows Op1 and Op2 in FIG. 1 are based on the corner portion of the crosswalk, and are a pair of parallel line segments in a real space. Therefore, the pair of optical flows Op1 and Op2 is a correct combination (hereinafter, appropriately referred to as a "correct flow") for posture estimation.

On the other hand, in the ROI 30, many optical flows including a case of not being parallel to the optical flows Op1 and Op2 are extracted in addition to the optical flows Op1 and Op2. Therefore, among the optical flows, a pair of erroneous combination (hereinafter, appropriately referred to as an "erroneous flow") with respect to the above correct flow is generated. Based on this erroneous flow, the posture of the camera 11 cannot be correctly estimated.

Figure 2:
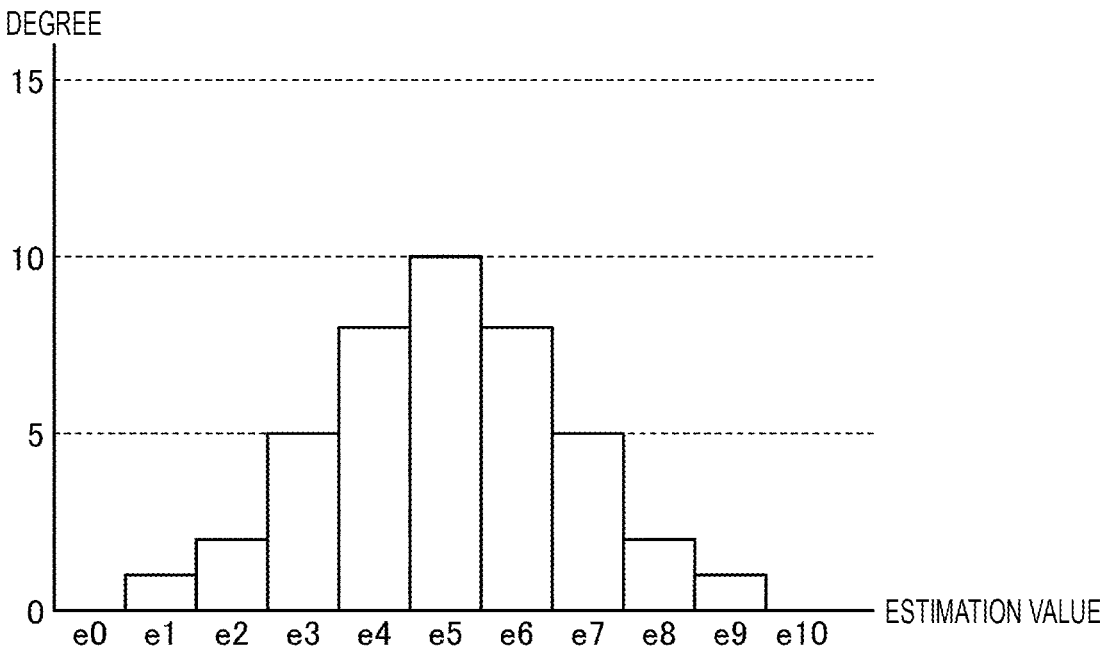
FIG. 2 is a diagram (part 2) illustrating the method for determining an abnormality in a camera attachment state according to the embodiment.

Therefore, in the posture estimation processing of the camera 11, rotation angles of axes of PAN, TILT, and ROLL are estimated for each of the pair of extracted optical flows, and an axial deviation of the camera 11 is determined based on a median value when estimation values are statistically converted into a histogram as shown in FIG. 2. In the example of FIG. 2, an estimation value e5, which is the median value, is adopted as the angle estimation value.

The angle estimation value estimated in this way is used, for example, in image recognition processing in a driving assistance function of a vehicle system as described above, but when a deviation amount from a known calibration value is very small, it is normally possible to perform correction in the image recognition processing. However, when the deviation amount is too large to be corrected, for example, an erroneous detection or a non-detection of an object occurs in the image recognition processing, and the driving assistance function does not operate normally, and thus it is necessary to readjust an attachment state of the camera 11.

An example in which the readjustment is necessary is shown in FIGS. 3 and 4. FIG. 3 shows a specific example indicating a deviation in an upper direction among deviations in an upper-lower direction, but the same applies to a deviation in a lower direction. FIG. 4 shows a specific example of a deviation in a left direction among deviations in a left-right direction, but the same applies to a deviation in a right direction.

As shown in FIG. 3, when the attachment state of the camera 11 is deviated in the upper-lower direction, for example, the sky or a vehicle body of an own vehicle is displayed in the ROI 30, and thus the number of feature points in the ROI 30 is reduced. In this case, data of the pair of optical flows based on feature points on a road surface (hereinafter, appropriately referred to as "pair data") cannot be accumulated sufficiently enough to be statistically processed.

As shown in FIG. 4, when the attachment state of the camera 11 is deviated in the left-right direction, feature points appear in the ROI 30, but many feature points of, for example, a building other than the road surface are included. That is, feature points appear in the ROI 30, but the variation in the angle estimation value increases.

Figure 5:
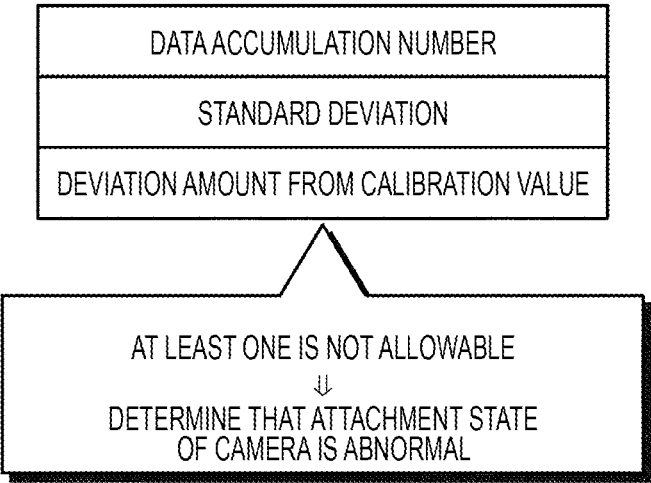
FIG. 5 is a diagram (part 5) illustrating the method for determining an abnormality in a camera attachment state according to the embodiment.

Therefore, in the method for determining an abnormality in a camera attachment state according to the embodiment, the controller 15 (see FIG. 6) included in the in-vehicle device 10 determines that the attachment state of the camera 11 is abnormal when at least one of a data accumulation number, a standard deviation, and a deviation amount from a calibration value is not allowable as shown in FIG. 5.

The data accumulation number is a data accumulation number of the pair data described above. The standard deviation is a standard deviation of angle estimation values based on the pair data. The deviation amount from a calibration value is a deviation amount from a known calibration value, in other words, the latest calibration value.

A case where the data accumulation number is not allowable is, for example, a case where the data accumulation number is a predetermined value or less, and corresponds to the example shown in FIG. 3. A case where the standard deviation is not allowable is, for example, a case where the standard deviation is a predetermined value or more, and corresponds to the example shown in FIG. 4. A case where the deviation amount from a calibration value is not allowable is a case where recalibration is performed based on the angle estimation value calculated without readjustment on the attachment state, and corresponds to a case where correction in the image recognition processing is not possible.

It is possible to accurately detect an abnormality in the attachment state of the camera 11 by determining that the attachment state of the camera 11 is abnormal when at least one of the data accumulation number, the standard deviation, and the deviation amount from a calibration value is not allowable.

Since the method for determining an abnormality uses various types of known data (that is, the data accumulation number, the standard deviation, and the deviation amount from a calibration value) used in the algorithm of the posture estimation processing, it is possible to easily detect an abnormality in the attachment state of the camera 11.

Therefore, according to the method for determining an abnormality in a camera attachment state according to the embodiment, it is possible to accurately and easily detect an abnormality in the attachment state of the camera 11.

Although FIG. 2 shows an example in which in the posture estimation processing, the posture of the camera 11 is estimated based on the "median value" of the angle estimation values at which a camera is attached that are estimated from the pair data described above, a normal distribution is obtained in most cases if the data accumulation number is sufficient. Therefore, the fact is "median value mode value". Therefore, in the posture estimation processing, either the "median value" or the "mode value" may be adopted. In the posture estimation processing, it is advantageous in terms of processing cost when the "median value" is adopted. On the other hand, in the posture estimation processing, higher accuracy can be obtained when the "mode value" is adopted. In the present embodiment, the "median value" is adopted as shown in FIG. 2.

Hereinafter, a configuration example of the in-vehicle device 10 to which the method for determining an abnormality in a camera attachment state described above is applied will be described more specifically.

Figure 6:
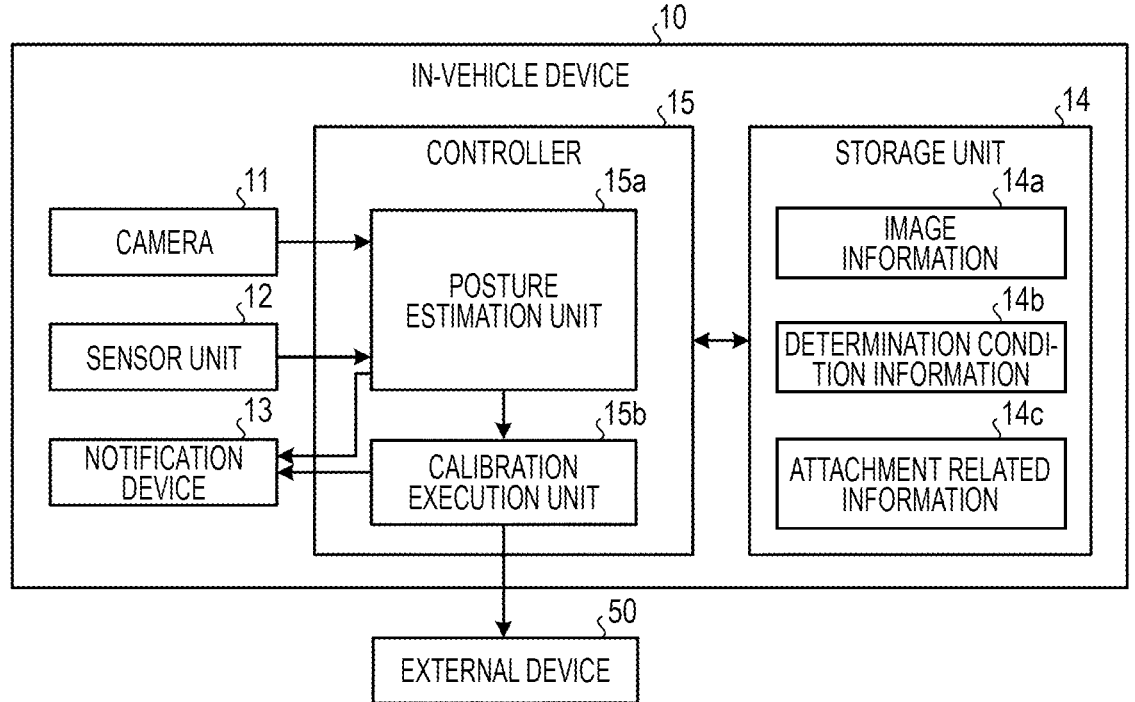
FIG. 6 is a block diagram showing a configuration example of an in-vehicle device according to the embodiment.
Figure 7:
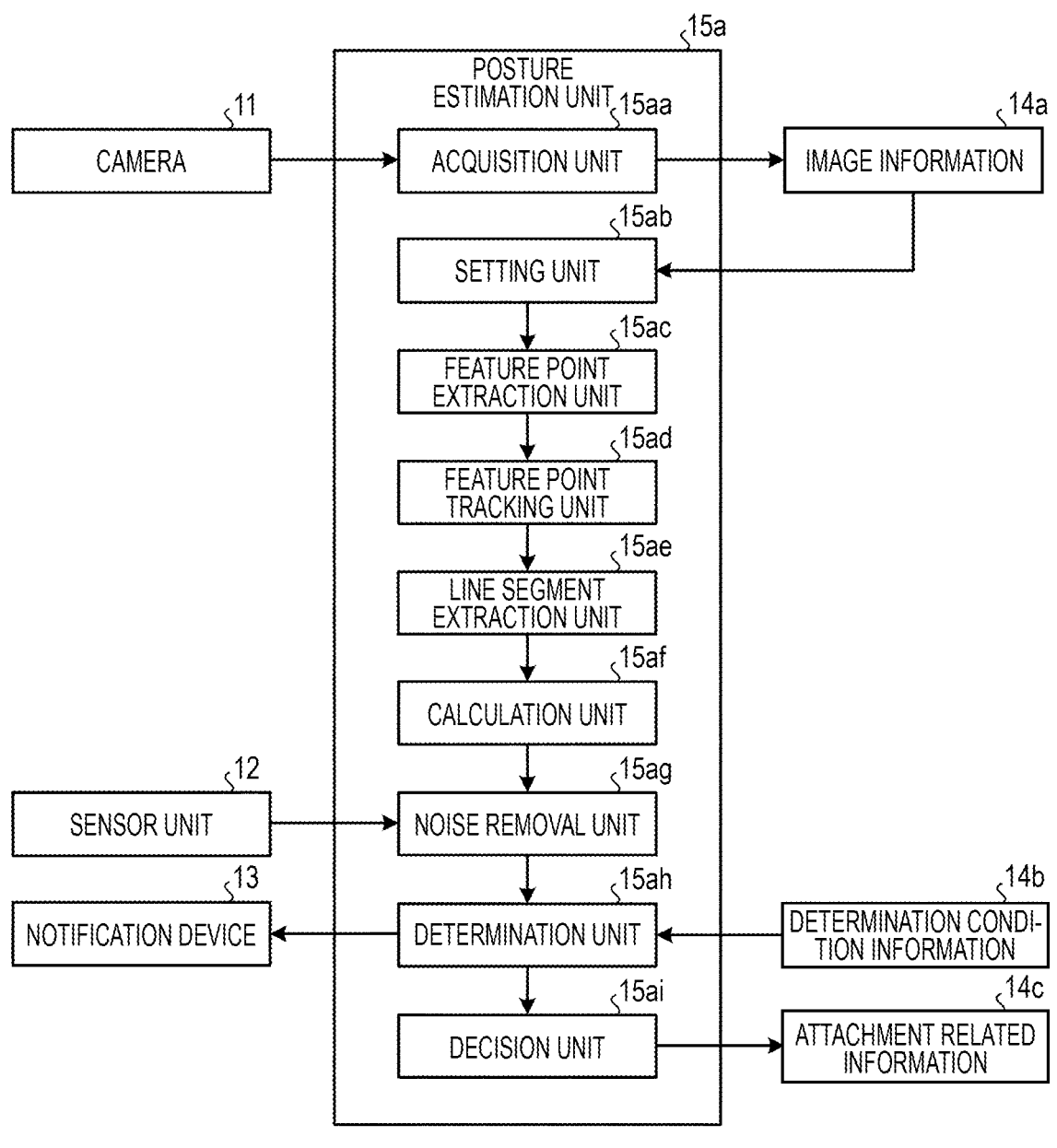
FIG. 7 is a block diagram showing a configuration example of a posture estimation unit.

FIG. 6 is a block diagram showing a configuration example of the in-vehicle device 10 according to the embodiment. FIG. 7 is a block diagram showing a configuration example of a posture estimation unit 15a. In FIGS. 6 and 7, only components necessary for describing the features of the present embodiment are shown, and description of general components is omitted.

In other words, each component shown in FIGS. 6 and 7 is a functional concept, and is not necessarily physically configured as shown. For example, specific forms of distribution and integration of the blocks are not limited to those shown in the drawings, and all or part of the blocks may be functionally or physically distributed or integrated in any unit depending on various loads or use conditions.

In the description with reference to FIGS. 6 and 7, the description of the components already described may be simplified or omitted.

As shown in FIG. 6, the in-vehicle device 10 according to the embodiment includes the camera 11, a sensor unit 12, a notification device 13, a storage unit 14, and the controller 15.

The camera 11 includes an imaging element such as a charge coupled device (CCD) or a complementary metal oxide semiconductor (CMOS), and captures a predetermined imaging range using the imaging element. The camera 11 is attached to various portions of the vehicle such as a windshield and a dashboard so as to capture a predetermined imaging range in front of the vehicle.

The sensor unit 12 includes various sensors to be mounted on the vehicle. The sensor unit 12 includes, for example, a vehicle speed sensor and a G sensor. The notification device 13 is a device that notifies a user of information related to the attachment state of the camera 11. The notification device 13 is implemented by, for example, a display, a speaker, or the like.

The storage unit 14 is implemented by a storage device such as a random access memory (RAM) or a flash memory. In the example of FIG. 6, the storage unit 14 stores image information 14a, determination condition information 14b, and attachment related information 14c.

The image information 14a stores a camera image captured by the camera 11. The determination condition information 14b is information relating to determination conditions of the attachment state of the camera 11. The determination conditions included in the determination condition information 14b will be described later with reference to FIGS. 8 and 9.

The attachment related information 14c is information related to the attachment state of the camera 11. The attachment related information 14c includes design values and calibration values related to the attachment position and the posture of the camera 11. The attachment related information 14c includes various parameters such as camera parameters and threshold values used in the posture estimation processing executed by the posture estimation unit 15a to be described later.

The controller 15 corresponds to a so-called processor or a control unit. The controller 15 is implemented by a central processing unit (CPU), a micro processing unit (MPU), or the like executing a program (not shown) according to the embodiment stored in the storage unit 14 using a RAM as a work area. The controller 15 may be implemented by an integrated circuit such as an application specific integrated circuit (ASIC) or a field programmable gate array (FPGA).

The controller 15 includes the posture estimation unit 15a and a calibration execution unit 15b, and implements or executes a function or an effect of information processing to be described below.

The posture estimation unit 15a executes the posture estimation processing using an optical flow based on a feature point on a road surface in the ROI 30. In the posture estimation processing, the posture estimation unit 15a determines that the attachment state of camera 11 is abnormal when at least one of the data accumulation number, the standard deviation, and the deviation amount from the calibration value is not allowable.

A configuration example of the posture estimation unit 15a will be described more specifically with reference to FIG. 7. As shown in FIG. 7, the posture estimation unit 15a includes an acquisition unit 15aa, a setting unit 15ab, a feature point extraction unit 15ac, a feature point tracking unit 15ad, a line segment extraction unit 15ae, a calculation unit 15af, a noise removal unit 15ag, a determination unit 15ah, and a decision unit 15ai.

The acquisition unit 15aa acquires a captured image by the camera 11 and stores the captured image in the image information 14a. The setting unit 15ab sets the ROI 30 to be processed in the posture estimation for the camera 11 with respect to the camera image stored in the image information 14a.

The feature point extraction unit 15ac extracts feature points in the ROI 30 set by the setting unit 15ab.

The feature point tracking unit 15ad tracks each feature point extracted by the feature point extraction unit 15ac between frames, and extracts an optical flow for each feature point. The line segment extraction unit 15ae removes a noise component from the optical flow extracted by the feature point tracking unit 15ad, and extracts a pair group of line segments based on each optical flow.

The calculation unit 15af calculates rotation angles of axes of PAN, TILT, and ROLL for each of the pair of line segments extracted by the line segment extraction unit 15ae using the algorithm disclosed in the above-mentioned website of Keio University ((online), Keio University, (retrieved on Jul. 25, 2022), the Internet URL:http://im-lab.net/artoolkit-overview/).

The noise removal unit 15ag removes noise due to low speed and steering angle from each angle estimation value calculated by the calculation unit 15af based on a sensor value of the sensor unit 12.

The determination unit 15ah executes determination processing of determining whether the attachment state of the camera 11 is abnormal when at least one of the data accumulation number, the standard deviation, and the deviation amount from a calibration value is not allowable, in addition to converting the angle estimation values from which a noise component is removed into a histogram.

At this time, the determination unit 15*ah* refers to normality determination conditions and abnormality determination conditions included in the determination condition information 14*b*. FIG. 8 is a diagram showing the normality determination conditions included in the determination condition information 14*b*. FIG. 9 is a diagram showing the abnormality determination conditions included in the determination condition information 14*b*. Hereinafter, the "calibration value" is appropriately referred to as a "calib value".

When the normality determination conditions shown in FIG. 8 are satisfied, the determination unit 15*ah* determines that the attachment state of the camera 11 is normal. As shown in (1) of FIG. 8, during a predetermined period of time from a time point of ignition (IG) ON, called "immediately after IG ON", the determination unit 15*ah* executes the determination processing with reference to the normality determination conditions shown in FIG. 8 every 10 minutes of traveling time.

The determination unit 15*ah* determines that the attachment state of the camera 11 is normal in a case of (1) immediately after IG ON where the data accumulation number is 100 or more and the standard deviation is 10 or less.

As shown in (2) of FIG. 8, after immediately after IG ON (that is, after (1)), the determination unit 15*ah* executes the determination processing with reference to the normality determination conditions shown in FIG. 8 every 30 minutes of traveling time.

The determination unit 15*ah* determines that the attachment state of the camera 11 is normal in a case of (2) after immediately after IG ON where the data accumulation number is 100 or more and the standard deviation is 5 or less. "100 or more" of the data accumulation number as well as "10 or less" and "5 or less" of the standard deviation shown in FIG. 8 correspond to examples of a "reference value".

When the normality determination conditions shown in FIG. 8 are not satisfied, the determination unit 15*ah* determines that the attachment state of the camera 11 is abnormal. In a case of the abnormality, the determination unit 15*ah* determines the estimated state depending on whether the abnormality determination conditions shown in FIG. 9 are satisfied.

Specifically, as shown in FIG. 9, the determination unit 15*ah* executes the determination processing with reference to the abnormality determination conditions shown in FIG. 9 every 10 minutes of traveling time in a case of (1) immediately after IG ON. When the data accumulation number is 10 or less, the determination unit 15*ah* estimates that the road surface is not displayed (deviation downward in TILT) (see *1 of (1-1) in FIG. 9).

When the data accumulation number is 100 or more and the standard deviation is 20 or more, the determination unit 15*ah* estimates that the road surface is not displayed (see *2 of (1-2) in FIG. 9). *1 corresponds to, for example, the state described with reference to FIG. 3. *2 corresponds to, for example, the state described with reference to FIG. 4.

The determination unit 15*ah* executes the determination processing with reference to the abnormality determination conditions shown in FIG. 9 every 10 minutes of the traveling time in a case of (2-1) of (2) after immediately after IG ON. When the data accumulation number is 10 or more, the determination unit 15*ah* estimates that the road surface is not displayed (deviation downward in TILT) (see *1 of (2-1) in FIG. 9).

The determination unit 15*ah* executes the determination processing with reference to the abnormality determination conditions shown in FIG. 9 every 30 minutes of the traveling time in a case of (2-2) and (2-3). When the data accumulation number is 100 or more and the standard deviation is 20 or more, the determination unit 15*ah* estimates that the road surface is not displayed (see *2 of (2-2) in FIG. 9).

When the data accumulation number is 100 or more, the standard deviation is 5 or less, and the deviation amount from the calib value is 10 deg or more, the determination unit 15*ah* estimates that the road surface is not displayed but the deviation amount from the given calibration value is large (see *3 of (2-3) in FIG. 9).

The description returns to FIG. 7. When it is determined that the attachment state of the camera 11 is abnormal, the determination unit 15*ah* notifies the notification device 13 of the abnormality and the estimated state. The user is requested to readjust the attachment state of the camera 11 at, for example, a dealer based on the notification content. When the attachment state of the camera 11 is abnormal, the determination unit 15*ah* abnormally ends the posture estimation processing, for example.

On the other hand, when it is determined that the attachment state of the camera 11 is normal, the determination unit 15*ah* causes the decision unit 15*ai* to decide the angle estimation value. The decision unit 15*ai* decides the angle estimation values of PAN, TILT, and ROLL based on the median value of the angle estimation values that are converted into a histogram by the determination unit 15*ah*. The decision unit 15*ai* stores the decided angle estimation values in the attachment related information 14*c*.

The description returns to FIG. 6. The calibration execution unit 15*b* executes calibration based on an estimation result by the posture estimation unit 15*a*. Specifically, the calibration execution unit 15*b* calculates an error between the angle estimation values estimated by the posture estimation unit 15*a* and the design values included in the attachment related information 14*c*, and notifies an external device 50 of the error as the calibration value.

The external device 50 is a device that implements, for example, a driving assistance function such as a parking frame detection function or an automatic parking function. The calibration execution unit 15*b* notifies the notification device 13 of a calibration execution result. The calibration execution result in this case is an execution result performed in a state where the attachment state of the camera 11 is normal.

Figure 10:
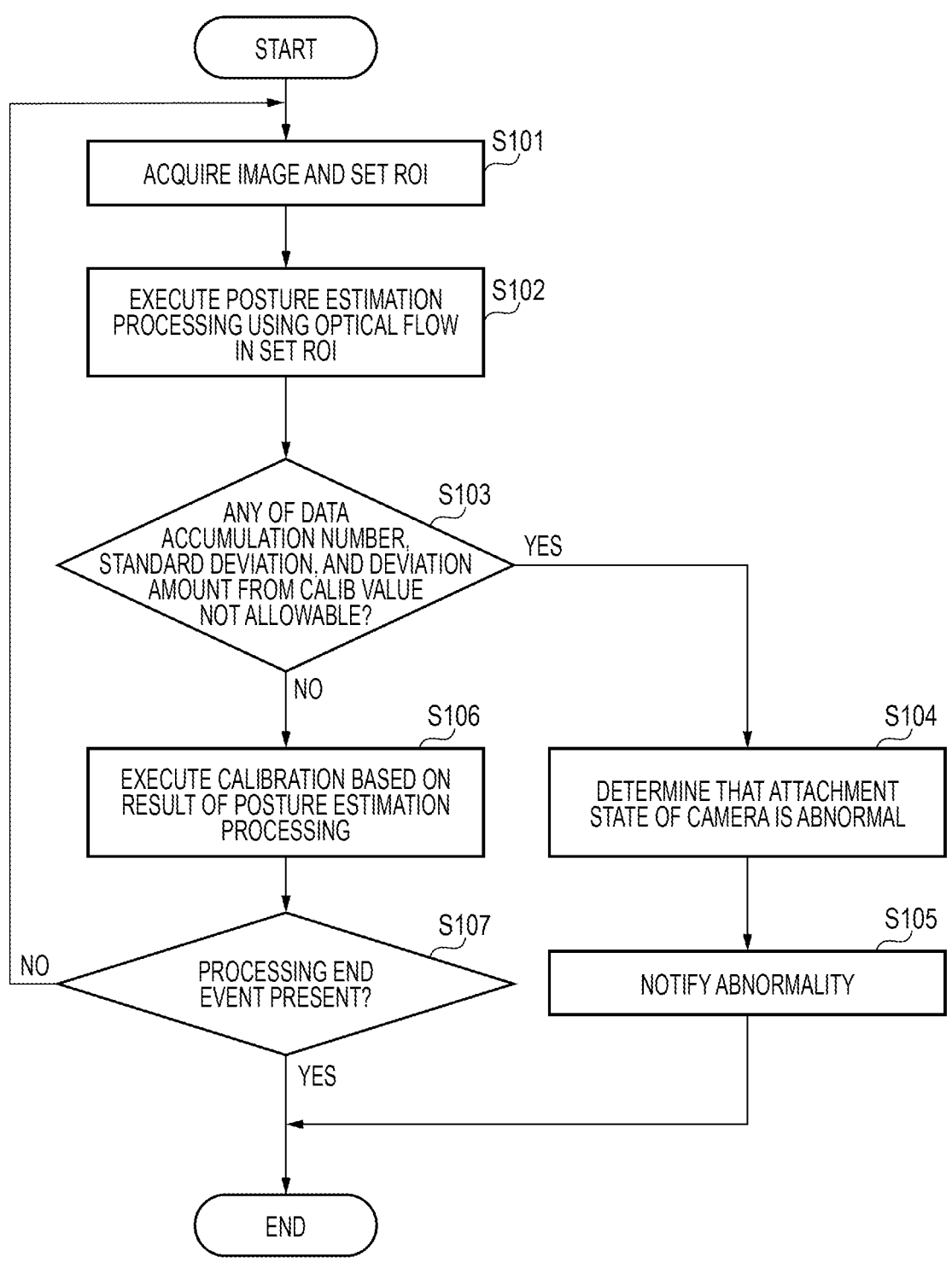
FIG. 10 is a flowchart showing a processing procedure executed by the in-vehicle device according to the embodiment.

Next, a processing procedure executed by the in-vehicle device 10 will be described with reference to FIG. 10. FIG. 10 is a flowchart showing the processing procedure executed by the in-vehicle device 10 according to the embodiment.

As shown in FIG. 10, the controller 15 of the in-vehicle device 10 acquires a camera image from the camera 11 and sets the ROI 30 (step S101).

Then, the controller 15 executes the posture estimation processing using an optical flow in the set ROI 30 (step S102).

Then, the controller 15 determines in the posture estimation processing whether any of the data accumulation number, the standard deviation, and the deviation amount from the calib value is not allowable (step S103).

When any one is not allowable (Yes in step S103), the controller 15 determines that the attachment state of the camera 11 is abnormal (Step S104), and notifies the notification device 13 of the abnormality (Step S105). Then, the processing ends.

When all of the data accumulation number, the standard deviation, and the deviation amount from the calib value are allowable (No in step S103), the controller 15 executes calibration based on a result of the posture estimation processing (step S106).

Then, the controller 15 determines whether there is a processing end event (step S107). The processing end event is, for example, arrival of a time period during which the posture estimation processing is not executed, stop of an engine, power-off, or the like.

When the processing end event does not occur (No in step S107), the controller 15 repeats the processing from step S101. When the processing end event occurs (Yes in step S107), the controller 15 ends the processing.

As described above, the in-vehicle device 10 (corresponding to an example of the "information processing device") according to the embodiment includes the controller 15. The controller 15 executes the posture estimation processing of extracting a pair group of line segments based on an optical flow of a feature point on a road surface from the ROI 30 (corresponding to an example of the "processing target region") set in the camera image captured by the camera 11 (corresponding to an example of the "in-vehicle camera") and estimating a posture of the camera 11 based on an angle estimation value at which the camera 11 is attached estimated from the pair data of the pair group. The controller determines that the attachment state of the camera 11 is abnormal when at least one of the data accumulation number of the pair data, the standard deviation of the angle estimation value, and the deviation amount from a given calibration value related to the posture in the posture estimation processing is out of a preset range.

Therefore, according to the in-vehicle device 10 according to the embodiment, it may be possible to accurately and easily detect an abnormality in the attachment state of the camera 11.

The controller 15 determines that the abnormality occurs when any one of the data accumulation number, the standard deviation, and the deviation amount deviates from a preset reference value by a predetermined value or more.

Therefore, according to the in-vehicle device 10 according to the embodiment, a case where any one of the data accumulation number, the standard deviation, and the deviation amount greatly deviates from the reference value can be detected as an abnormal attachment state of the camera 11.

The controller 15 determines that the abnormality occurs when the data accumulation number is $1/10$ or less of the reference value.

Therefore, according to the in-vehicle device 10 according to the embodiment, it is possible to detect an abnormality in the attachment state of the camera 11 based on the small number of feature points on the road surface.

The controller 15 determines that the abnormality occurs when the reference value is 100 or more and the data accumulation number is 10 or less.

Therefore, according to the in-vehicle device 10 according to the embodiment, for example, it is possible to detect an unallowable deviation in the upper-lower direction of the camera 11 when the reference value is 100 or more and the data accumulation number is 10 or less.

The controller 15 determines that the abnormality occurs when the standard deviation is 2 times or more the reference value.

Therefore, according to the in-vehicle device 10 according to the embodiment, it is possible to detect an abnormality in the attachment state of the camera 11 based on a magnitude of the variation in the angle estimation value.

The controller 15 determines that the abnormality occurs when the reference value is or less and the standard deviation is 20 or more.

According to the in-vehicle device 10 of the embodiment, it is possible to detect, for example, an unallowable deviation in the left-right direction of the camera 11 when the reference value is 10 or less and the standard deviation is 20 or more.

The controller 15 determines that the abnormality occurs when the deviation amount is 10 deg or more.

Therefore, according to the in-vehicle device 10 according to the embodiment, it is possible to detect an abnormality in the attachment state of the camera 11 that cannot be recalibrated without readjusting the attachment state of the camera 11.

The controller 15 estimates the posture of the camera 11 based on the median value of the angle estimation value in the posture estimation processing.

Therefore, according to the in-vehicle device 10 according to the embodiment, the posture of the camera 11 can be estimated advantageously in terms of processing cost based on the median value of the angle estimation value.

The controller 15 estimates the posture of the camera 11 based on the mode value of the angle estimation value in the posture estimation processing.

Therefore, according to the in-vehicle device 10 according to the embodiment, the posture of the camera 11 can be accurately estimated based on the mode value of the angle estimation value.

The method for determining an abnormality in a camera attachment state according to the embodiment is an information processing method executed by the in-vehicle device 10, the method including: executing posture estimation processing of extracting a pair group of line segments based on an optical flow of a feature point on a road surface from the ROI 30 set in a camera image captured by the camera 11 and estimating a posture of the camera 11 based on an angle estimation value at which the camera 11 is attached estimated from pair data of the pair group; and determining that an attachment state of the camera 11 is abnormal when at least one of a data accumulation number of the pair data, a standard deviation of the angle estimation value, and a deviation amount from a known calibration value related to the posture in the posture estimation processing is out of a preset range.

Therefore, according to the method for determining an abnormality in a camera attachment state according to the embodiment, it is possible to accurately and easily detect an abnormality in the attachment state of the camera 11.

The program according to the embodiment causes a computer to execute the following steps: executing posture estimation processing of extracting a pair group of line segments based on an optical flow of a feature point on a road surface from the ROI 30 set in a camera image captured by the camera 11 and estimating a posture of the camera 11 based on an angle estimation value at which the camera 11 is attached estimated from pair data of the pair group; and determining that an attachment state of the camera 11 is abnormal when at least one of a data accumulation number of the pair data, a standard deviation of the angle estimation value, and a deviation amount from a known calibration value relating to the posture in the posture estimation processing is out of a preset range.

Therefore, according to the program according to the embodiment, it is possible to accurately and easily detect an abnormality in the attachment state of the camera 11.

The program according to the embodiment may be recorded in a computer-readable recording medium such as a hard disk, a flexible disk (FD), a CD-ROM, a magneto-optical disk (MO), a digital versatile disc (DVD), or a universal serial bus (USB) memory, and may be executed by being read from the recording medium by a computer. The recording medium is also an aspect of the present disclosure.

Values of various parameters in the normality determination conditions and the abnormality determination conditions described in the above embodiment are merely examples, and the values are not limited thereto.

Additional effects and modifications can be easily derived by a person skilled in the art. Therefore, broader aspects of the present invention are not limited to the specific details and the representative embodiment shown and described above. Therefore, various modifications can be made without departing from the spirit or scope of the general inventive concept as defined by the appended claims and equivalents thereof

What is claimed is:

1. An information processing device comprising:
a controller configured to execute a posture estimation processing by extracting a pair group of line segments based on optical flows of a plurality of feature points on a road surface corresponding to each one of the line segments in the pair group from a processing target region set in a camera image captured by an in-vehicle camera and by estimating a posture of the in-vehicle camera based on an angle estimation value at which the in-vehicle camera is attached, the angle estimation value being estimated from each pair data included in the pair group, wherein the pair data includes data of a pair of the optical flows based on the plurality of feature points on the road surface, wherein
the controller is configured to
determine that an attachment state of the in-vehicle camera is abnormal in response to a data accumulation number of the pair data being $1/10$ or less of a preset reference value.

2. The information processing device according to claim 1, wherein the controller is configured to determine that the abnormality occurs in response to the data accumulation number being 10 or less with the reference value being 100 or more.

3. The information processing device according to claim 1, wherein
the controller is configured to
estimate the posture of the in-vehicle camera based on a median value of the angle estimation value in the posture estimation processing.

4. The information processing device according to claim 1, wherein
the controller is configured to
estimate the posture of the in-vehicle camera based on a mode value of the angle estimation value in the posture estimation processing.

5. An information processing method executed by an information processing device, the method comprising:
executing a posture estimation processing by extracting a pair group of line segments based on optical flows of a plurality of feature points on a road surface corresponding to each one of the line segments in the pair group from a processing target region set in a camera image captured by an in-vehicle camera and by estimating a posture of the in-vehicle camera based on an angle estimation value at which the in-vehicle camera is attached, the angle estimation value being estimated from pair data of the pair group, wherein the pair data includes data of a pair of the optical flows based on the plurality of feature points on the road surface; and
determining that an attachment state of the in-vehicle camera is abnormal in response to a data accumulation number of the pair data being $1/10$ or less of a preset reference value.

6. A non-transitory computer readable medium storing a program that causes a computer to execute a process comprising:
executing a posture estimation processing by extracting a pair group of line segments based on optical flows of a plurality of feature points on a road surface corresponding to each one of the line segments in the pair group from a processing target region set in a camera image captured by an in-vehicle camera and by estimating a posture of the in-vehicle camera based on an angle estimation value at which the in-vehicle camera is attached, the angle estimation value being estimated from pair data of the pair group, wherein the pair data includes data of a pair of the optical flows based on the plurality of feature points on the road surface; and
determining that an attachment state of the in-vehicle camera is abnormal in response to a data accumulation number of the pair data being $1/10$ or less of a preset reference value.

* * * * *